(12) United States Patent
Morhard et al.

(10) Patent No.: US 7,855,263 B2
(45) Date of Patent: Dec. 21, 2010

(54) PROCESS FOR PRODUCING THERMOFORMED ARTICLES

(75) Inventors: Friederike Morhard, Bangkok (TH); Gabriella Sartori, Ferrara (IT); Alexander Fuchs, Ferrara (IT); Claus Gabriel, Ludwigshafen (DE)

(73) Assignee: Basell Polyolefine GmbH, Wesseling (DE)

( * ) Notice: Subject to any disclaimer, the term of this patent is extended or adjusted under 35 U.S.C. 154(b) by 435 days.

(21) Appl. No.: 11/883,715

(22) PCT Filed: Jan. 30, 2006

(86) PCT No.: PCT/EP2006/050533

§ 371 (c)(1), (2), (4) Date: May 27, 2008

(87) PCT Pub. No.: WO2006/082176

PCT Pub. Date: Aug. 10, 2006

(65) Prior Publication Data

US 2009/0012239 A1 Jan. 8, 2009

Related U.S. Application Data

(60) Provisional application No. 60/652,178, filed on Feb. 10, 2005.

(30) Foreign Application Priority Data

Feb. 3, 2005 (EP) .................................. 05100747

(51) Int. Cl.
- C08L 23/10 (2006.01)
- C08F 10/04 (2006.01)
- C08F 10/14 (2006.01)
- C08F 110/04 (2006.01)
- C08F 110/06 (2006.01)

(52) U.S. Cl. ..................... 526/351; 526/348.6; 525/191; 525/240

(58) Field of Classification Search ................. 526/351, 526/348.6; 525/191, 240
See application file for complete search history.

(56) References Cited

U.S. PATENT DOCUMENTS

| | | | |
|---|---|---|---|
| 5,698,487 A | 12/1997 | Sacchetti et al. | |
| 6,043,325 A | 3/2000 | Tsutsui et al. | |
| 6,184,402 B1 | 2/2001 | Yamazaki et al. | |
| 6,399,533 B2 | 6/2002 | Sacchetti et al. | |
| 6,444,606 B1 | 9/2002 | Bingel et al. | |
| 6,492,539 B1 | 12/2002 | Bingel et al. | |
| 6,559,252 B1 | 5/2003 | Horton et al. | |
| 6,608,224 B2 | 8/2003 | Resconi et al. | |
| 6,841,501 B2 | 1/2005 | Resconi et al. | |
| 6,878,786 B2 | 4/2005 | Resconi et al. | |
| 6,943,215 B2 * | 9/2005 | Stevens et al. | 525/191 |
| 6,953,829 B2 | 10/2005 | Kratzer et al. | |
| 6,963,017 B2 | 11/2005 | Bingel et al. | |
| 7,038,070 B2 | 5/2006 | Bingel et al. | |
| 7,101,940 B2 | 9/2006 | Schottek et al. | |
| 7,314,903 B2 | 1/2008 | Resconi et al. | |
| 2003/0149199 A1 | 8/2003 | Schottek et al. | |
| 2003/0204017 A1 | 10/2003 | Stevens et al. | |
| 2004/0132612 A1 | 7/2004 | Resconi et al. | |
| 2006/0058463 A1 | 3/2006 | Fuchs et al. | |
| 2006/0167128 A1 | 7/2006 | Olivier et al. | |
| 2006/0167185 A1 | 7/2006 | Fuchs et al. | |

FOREIGN PATENT DOCUMENTS

| | | |
|---|---|---|
| DE | 19962814 | 6/2001 |
| DE | 19962910 | 7/2001 |
| EP | 633272 | 1/1995 |
| EP | 936247 | 8/1999 |
| EP | 1008607 | 6/2000 |
| WO | 91/02012 | 2/1991 |
| WO | 92/00333 | 1/1992 |
| WO | 95/32995 | 12/1995 |
| WO | 98/40331 | 9/1998 |
| WO | 98/40416 | 9/1998 |
| WO | 99/21899 | 5/1999 |

(Continued)

Primary Examiner—Nathan M Nutter
(74) Attorney, Agent, or Firm—William R. Reid

(57) ABSTRACT

A process for obtaining thermoformed articles, comprising the following steps: a) forming a sheet comprising a propylene resin; b) thermoforming the sheet obtained in step a); wherein said propylene resin has the following characteristics: a) distribution of molecular weight Mw/Mn lower than 4; preferably lower than 3; b) 2,1 insertions measured with by 13C-NMR lower than 0.50%; preferably lower than 0.40%; c) eta* and the frequency ω meet the following relation for ω comprised between 0.1 ad 1: eta*>3700ω(−0 13) d) melt flow rate (MFR) (ISO 1133) lower than 5; preferably lower than 4; more preferably lower than 3; wherein the polypropylene resin comprises: (i) from 10 to 100% by weight of a propylene homopolymer or a propylene copolymer containing from 0.1% to 10% by mol of derived units of ethylene or an alpha-olefin of formula CH2═CHZ wherein Z is a linear or branched C2-C20 radical; and (ii) from 0 to 90% by weight of a propylene copolymer containing from 0.1% to 10% by mol of derived units of ethylene or an alpha-olefin of formula CH2═CHZ wherein Z is a linear or branched C2-C20 radical, said propylene copolymer having a content of ethylene or an alpha-olefin of formula CH2═CHZ different from the propylene copolymer (i).

9 Claims, No Drawings

FOREIGN PATENT DOCUMENTS

| | | |
|---|---|---|
| WO | 00/12572 | 3/2000 |
| WO | 01/21674 | 3/2001 |
| WO | 01/62764 | 8/2001 |
| WO | 02/102811 | 12/2002 |
| WO | 03/106523 | 12/2003 |
| WO | 03/106553 | 12/2003 |
| WO | 2004/005360 | 1/2004 |

* cited by examiner

PROCESS FOR PRODUCING THERMOFORMED ARTICLES

The present invention relates to a process for producing thermoformed articles by subjecting sheets of propylene polymer having certain features to a thermoforming process. The present invention further relates to the thermoformed articles obtained therefrom.

The well-known crystalline polypropylene of commerce is a normally solid, predominantly isotactic, semi-crystalline, thermoplastic polymer mixture formed by the polymerization of propylene by Ziegler-Natta catalysis. In such catalysis the catalyst is formed by an inorganic compound of a metal of Groups I-III of the Perodic Table, (for example, an aluminum alkyl), and a compound of a transition metal of Groups IV-VIII of the Periodic Table, (for example, a titanium halide). A typical crystallinity is about 60% as measured by X-ray diffraction. Also, the typical weight average molecular weight (Mw) of the normally solid polypropylene of commerce is 100,000-4,000,000, while the typical number average molecular weight (Mn) thereof is 40,000-100,000. Moreover, the melting point of the normally solid polypropylene of commerce is about 162.degree. C.

Although the polypropylene of commerce has many desirable and beneficial properties, it is deficient in melt strength. When molten, it exhibits no strain hardening (an increase in resistance to stretching during elongation of the molten material). Thus it has a variety of melt processing shortcomings, including the onset of edge weave during high speed extrusion coating of paper or other substrates, sheet sag and local thinning in melt thermoforming, and flow instabilities in coextrusion of laminate structures. As a result, its use has been limited in such potential applications as, for example, extrusion coating, blow molding, profile extrusion, and thermoforming.

The crystalline polypropylene of commerce, however, is linear. That is, the polymer molecules are chains of propylene units without branches of propylene units. The reason is that in Ziegler-Natta catalysis secondary free radical reactions such as occur in the free radical polymerization of ethylene are highly improbable, if not non-existent.

WO 00/12572 relates to a polypropylene composition having improved melt strength and good processability. According to this document these properties are due to the average branching index of the branched polypropylene composition that is less than 0.95.

Therefore there is the need to provide a process for obtaining thermoforming articles by using a polypropylene resin having enhanced properties.

An object of the present invention is a process for obtaining thermoformed articles, comprising the following steps:
a) forming a sheet comprising a propylene resin;
b) thermoforming the sheet obtained in step a);

wherein said propylene resin has the following characteristics:
  a) distribution of molecular weight Mw/Mn lower than 4; preferably lower than 3;
  b) 2,1 insertions measured with by $^{13}C$—NMR lower than 0.50%; preferably lower than 0.40%;
  c) eta* and the frequency $\omega$ meet the following relation for $\omega$ comprised between 0.1 ad 1 (ISO 6721-10 carried out at 200° C.);

$$eta^* > 3700\omega^{(-0.13)}$$

preferably the relation is $eta^* > 3800\omega^{(-0.16)}$; more preferably it is $eta^* > 3900\omega^{(-0.18)}$; even more preferably $eta^* > 4000\omega^{(-0.2)}$ d) melt flow rate (MFR) (ISO 1133) (230° C./2.16 kg) lower than 5; preferably lower than 4; more preferably lower than 3;

the polypropylene resin comprises:

(i) from 10 to 100% by weight of a propylene homopolymer or a propylene copolymer containing from 0.1% to 10% by mol of derived units of ethylene or an alpha-olefin of formula $CH_2=CHZ$ wherein Z is a linear or branched $C_2$-$C_{20}$ radical; and (ii) from 0 to 90% by weight of a propylene copolymer containing from 0.1% to 10% by mol of derived units of ethylene or an alpha-olefin of formula $CH_2=CHZ$ wherein Z is a linear or branched $C_2$-$C_{20}$ radical, said propylene copolymer having a content of ethylene or alpha-olefin of formula $CH_2=CHZ$ different from the propylene copolymer (i).

Preferably the polypropylene resin has the following further characteristic:
  e) isotactic pentads (mmmm) measured with by $^{13}C$—NMR higher than 94%; preferably higher than 95%;

According to the process of the present invention it is possible to obtain thermoformed articles having very good mechanical properties such as impact properties. In particular the thermoformed articles show an improved transparency.

Without wishing to be bound by any particular theory it is believed that the high performance of the propylene resin used in the process of the present invention are due to the high number of long chain branching in the polymer chain. This structural feature is reflected by the correlation between eta* and the frequency $\omega$. This high number of long chain branching in the polymer chain is due to the particular metallocene-based catalyst system used for the production of said polypropylene resin. Metallocene-based catalyst systems fit for the production of said propylene based resin are described in US 2003/0149199, WO 9840331 and WO 9840416.

In particular the propylene resin useful for the process of the present invention is obtainable by using a catalyst system obtainable by contacting:

a) a metallocene compound of formula (I)

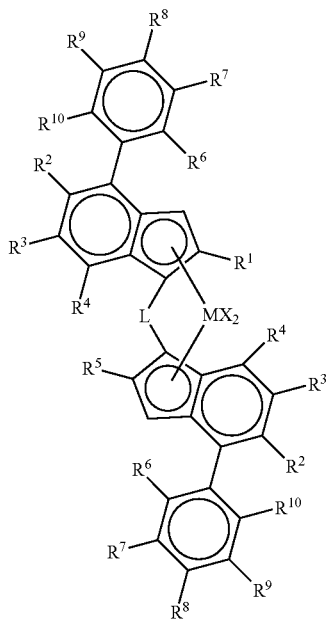

(I)

wherein
- M is a transition metal belonging to group 3, 4, 5, 6 or to the lanthanide or actinide groups in the Periodic Table of the Elements; preferably M is titanium, zirconium or hafnium;
- X, same or different, is a hydrogen atom, a halogen atom, or a R, OR, $OSO_2CF_3$, OCOR, SR, $NR_2$ or $PR_2$ group, wherein R is a are linear or branched, cyclic or acyclic, $C_1$-$C_{40}$-alkyl, $C_2$-$C_{40}$ alkenyl, $C_2$-$C_{40}$ alkynyl, $C_6$-$C_{40}$-aryl, $C_7$-$C_{40}$-alkylaryl or $C_7$-$C_{40}$-arylalkyl radicals; optionally containing heteroatoms belonging to groups 13-17 of the Periodic Table of the Elements; preferably R is a linear or branched $C_1$-$C_{20}$-alkyl radical; or two X can optionally form a substituted or unsubstituted butadienyl radical or a OR'O group wherein R' is a divalent radical selected from $C_1$-$C_{40}$ alkylidene, $C_6$-$C_{40}$ arylidene, $C_7$-$C_{40}$ alkylarylidene and $C_7$-$C_{40}$ arylalkylidene radicals; preferably X is a hydrogen atom, a halogen atom or a R group; more preferably X is chlorine or a $C_1$-$C_{10}$-alkyl radical; such as methyl, or ethyl radicals;
- L is a divalent $C_1$-$C_{40}$ hydrocarbon radical optionally containing heteroatoms belonging to groups 13-17 of the Periodic Table of the Elements or a divalent silylidene radical containing up to 5 silicon atom; preferably L is a divalent bridging group selected from $C_1$-$C_{40}$ alkylidene, $C_3$-$C_{40}$ cycloalkylidene, $C_6$-$C_{40}$ arylidene, $C_7$-$C_{40}$ alkylarylidene, or $C_7$-$C_{40}$ arylalkylidene radicals optionally containing heteroatoms belonging to groups 13-17 of the Periodic Table of the Elements, and silyliene radical containing up to 5 silicon atoms such as $SiMe_2$, $SiPh_2$; preferably L is a group $(Z(R'')_2)_n$ wherein Z is a carbon or a silicon atom, n is 1 or 2 and R'' is a $C_1$-$C_{20}$ hydrocarbon radical optionally containing heteroatoms belonging to groups 13-17 of the Periodic Table of the Elements; preferably R'' is a linear or branched, cyclic or acyclic, $C_1$-$C_{20}$-alkyl, $C_2$-$C_{20}$ alkenyl, $C_2$-$C_{20}$ alkynyl, $C_6$-$C_{20}$-aryl, $C_7$-$C_{20}$-alkylaryl or $C_7$-$C_{20}$-arylalkyl radicals optionally containing heteroatoms belonging to groups 13-17 of the Periodic Table of the Elements; more preferably the group $(Z(R'')_2)_n$ is $Si(CH_3)_2$, $SiPh_2$, SiPhMe, $SiMe(SiMe_3)$, $CH_2$, $(CH_2)_2$, and $C(CH_3)_2$; even more preferably $(Z(R'')_2)_n$ is $Si(CH_3)_2$;
- $R^1$ and $R^5$ are a $C_1$-$C_{40}$ hydrocarbon radical optionally containing heteroatoms belonging to groups 13-17 of the Periodic Table of the Element; preferably $R^1$ and $R^5$ are linear or branched, cyclic or acyclic, $C_1$-$C_{40}$-alkyl, $C_2$-$C_{40}$ alkenyl, $C_2$-$C_{40}$ alkynyl, $C_6$-$C_{40}$-aryl, $C_7$-$C_{40}$-alkylaryl or $C_7$-$C_{40}$-arylalkyl radicals; optionally containing heteroatoms belonging to groups 13-17 of the Periodic Table of the Elements; more preferably $R^1$ and $R^5$ are a linear or branched, saturated or unsaturated $C_1$-$C_{20}$-alkyl radical;
- $R^2$, $R^3$ and $R^4$, equal to or different from each other, are hydrogen atoms or $C_1$-$C_{40}$ hydrocarbon radicals optionally containing heteroatoms belonging to groups 13-17 of the Periodic Table of the Elements; preferably $R^2$, $R^3$ and $R^4$, equal to or different from each other are hydrogen atoms or linear or branched, cyclic or acyclic, $C_1$-$C_{40}$-alkyl, $C_2$-$C_{40}$ alkenyl, $C_2$-$C_{40}$ alkynyl, $C_6$-$C_{40}$-aryl, $C_7$-$C_{40}$-alkylaryl or $C_7$-$C_{40}$-arylalkyl radical; optionally containing heteroatoms belonging to groups 13-17 of the Periodic Table of the Elements; more preferably $R^2$, $R^3$ and $R^4$ are hydrogen atoms or $C_1$-$C_{20}$-alkyl radicals;
- $R^6$, $R^7$, $R^8$, $R^9$, and $R^{10}$ equal to or different from each other, are hydrogen atoms or $C_1$-$C_{40}$ hydrogen radicals optionally containing heteroatoms belonging to groups 13-17 of the Periodic Table of the Elements; preferably $R^2$, $R^3$ and $R^4$, equal to or different from each other are hydrogen atoms or linear or branched, cyclic or acyclic, $C_1$-$C_{40}$-alkyl, $C_2$-$C_{40}$ alkenyl, $C_2$-$C_{40}$ alkynyl, $C_6$-$C_{40}$-aryl, $C_7$-$C_{40}$-alkylaryl or $C_7$-$C_{40}$-arylalkyl radical; optionally containing heteroatoms belonging to groups 13-17 of the Periodic Table of the Elements; more preferably $R^2$, $R^3$ and $R^4$ are hydrogen atoms or $C_1$-$C_{40}$-alkyl radicals; with the proviso that at least one among $R^6$, $R^7$, $R^8$, $R^9$, and $R^{10}$ is different from an hydrogen atom; preferably $R^6$, $R^7$, $R^9$, and $R^{10}$ $R^8$ are hydrogen atoms;
- preferably $R^8$ is a $C_1$-$C_{40}$-alkyl radicals, more preferably $R^8$ is a $C_1$-$C_{40}$-alkyl radical wherein the atom in the alpha position is a secondary carbon or a tertiary carbon, such as isopropyl or tertbutyl radicals;

b) at least an alumoxane or a compound able to form an alkylmetallocene cation; and c) optionally an organo aluminum compound.

In one embodiment the substituent $R^1$ and $R^5$ in the compound of formula (I) are the same and they preferably are $C_1$-$C_{20}$-alkyl radicals such as methyl or ethyl radicals.

In another embodiment the substituent $R^1$ is a linear $C_1$-$C_{40}$-alkyl radical such as methyl or ethyl radicals and the substituent $R^5$ is a branched $C_1$-$C_{40}$-alkyl radical, preferably the substituent $R^5$ is a branched $C_1$-$C_{40}$-alkyl radical wherein the carbon atom in the alpha position is a secondary or a tertiary carbon atom, such as an isopropyl radical.

Alumoxanes used as component b) in the catalyst system according to the present invention can be obtained by reacting water with an organo-aluminium compound of formula $H_jAlU_{3-j}$ or $H_jAl_2U_{6-j}$, where the U substituents, same or different, are hydrogen atoms, halogen atoms, $C_1$-$C_{20}$-alkyl, $C_3$-$C_{20}$-cyclalkyl, $C_6$-$C_{20}$-aryl, $C_7$-$C_{20}$-alkylaryl or $C_7$-$C_{20}$-arylalkyl radicals, optionally containing silicon or germanium atoms, with the proviso that at least one U is different from halogen, and j ranges from 0 to 1, being also a non-integer number. In this reaction the molar ratio of Al/water is preferably comprised between 1:1 and 100:1.

The alumoxanes used in the process according to the invention are considered to be linear, branched or cyclic compounds containing at least one group of the type:

wherein the substituents U, same or different, are defined above.

In particular, alumoxanes of the formula:

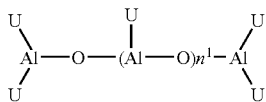

can be used in the case of linear compounds, wherein $n^1$ is 0 or an integer of from 1 to 40 and the substituents U are defined as above; or alumoxanes of the formula:

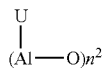

can be used in the case of cyclic compounds, wherein $n^2$ is an integer from 2 to 40 and the U substituents are defined as above.

Examples of alumoxanes suitable for use according to the present invention are methylalumoxane (MAO), tetra-(isobutyl)alumoxane (TIBAO), tetra-(2,4,4-trimethyl-pentyl)alumoxane (TIOAO), tetra-(2,3-dimethylbutyl)alumoxane (TDMBAO) and tetra-(2,3,3-trimethylbutyl)alumoxane (TTMBAO).

Particularly interesting cocatalysts are those described in WO 99/21899 and in WO01/21674 in which the alkyl and aryl groups have specific branched patterns.

Non-limiting examples of aluminium compounds that can be reacted with water to give suitable alumoxanes (b), described in WO 99/21899 and WO01/21674, are: tris(2,3,3-trimethyl-butyl)aluminium, tris(2,3-dimethyl-hexyl)aluminium, tris(2,3-dimethyl-butyl)aluminium, tris(2,3-dimethyl-pentyl)aluminium, tris(2,3-dimethyl-heptyl)aluminium, tris(2-methyl-3-ethyl-pentyl)aluminium, tris(2-methyl-3-ethyl-hexyl)aluminium, tris(2-methyl-3-ethyl-heptyl)aluminium, tris(2-methyl-3-propyl-hexyl)aluminium, tris(2-ethyl-3-methyl-butyl)aluminium, tris(2-ethyl-3-methyl-pentyl)aluminium, tris(2,3-diethyl-pentyl)aluminium, tris(2-propyl-3-methyl-butyl)aluminium, tris(2-isopropyl-3-methyl-butyl)aluminium, tris(2-isobutyl-3-methyl-pentyl)aluminium, tris(2,3,3-trimethyl-pentyl)aluminium, tris(2,3,3-trimethyl-hexyl)aluminium, tris(2-ethyl-3,3-dimethyl-butyl)aluminium, tris(2-ethyl-3,3-dimethyl-pentyl)aluminium, tris(2-isopropyl-3,3-dimethyl-butyl)aluminium, tris(2-trimethylsilyl-propyl)aluminium, tris(2-methyl-3-phenyl-butyl)aluminium, tris(2-ethyl-3-phenyl-butyl)aluminium, tris(2,3-dimethyl-3-phenyl-butyl)aluminium, tris(2-phenyl-propyl)aluminium, tris[2-(4-fluorophenyl)-propyl]aluminium, tris[2-(4-chloro-phenyl)-propyl]aluminium, tris[2-(3-isopropyl-phenyl)-propyl]aluminium, tris(2-phenyl-butyl)aluminium, tris(3-methyl-2-phenyl-butyl)aluminium, tris(2-phenyl-pentyl)aluminium, tris[2-(pentafluorophenyl)-propyl]aluminium, tris[2,2-diphenyl-ethyl]aluminium and tris[2-phenyl-2-methyl-propyl]aluminium, as well as the corresponding compounds wherein one of the hydrocarbyl groups is replaced with a hydrogen atom, and those wherein one or two of the hydrocarbyl groups are replaced with an isobutyl group.

Among the above aluminium compounds, trimethylaluminium (TMA), triisobutylaluminium (TIBA), tris(2,4,4-trimethyl-pentyl)aluminium (TIOA), tris(2,3-dimethylbutyl) aluminium (TDMBA) and tris(2,3,3-trimethylbutyl) aluminium (TTMBA) are preferred.

Non-limiting examples of compounds able to form an alkylmetallocene cation are compounds of formula $D^+E^-$, wherein $D^+$ is a Brnsted acid, able to donate a proton and to react irreversibly with a substituent X of the metallocene of formula (I) and $E^-$ is a compatible anion, which is able to stabilize the active catalytic species originating from the reaction of the two compounds, and which is sufficiently labile to be removed by an olefinic monomer. Preferably, the anion $E^-$ comprises one or more boron atoms. More preferably, the anion $E^-$ is an anion of the formula $BAr_4^{(-)}$, wherein the substituents Ar which can be identical or different are aryl radicals such as phenyl, pentafluorophenyl or bis(trifluoromethyl)phenyl. Tetrakis-pentafluorophenyl borate is particularly preferred compound, as described in WO 91/02012. Moreover, compounds of formula $BAr_3$ can be conveniently used. Compounds of this type are described, for example, in the International patent application WO 92/00333. Other examples of compounds able to form an alkylmetallocene cation are compounds of formula $BAr_3P$ wherein P is a substituted or unsubstituted pyrrol radical. These compounds are described in WO01/62764. Compounds containing boron atoms can be conveniently supported according to the description of DE-A-19962814 and DE-A-19962910. All these compounds containing boron atoms can be used in a molar ratio between boron and the metal of the metallocene comprised between about 1:1 and about 10:1; preferably 1:1 and 2.1; more preferably about 1:1.

Non limiting examples of compounds of formula $D^+E^-$ are:
Triethylammoniumtetra(phenyl)borate,
Tributylammoniumtetra(phenyl)borate,
Trimethylammoniumtetra(tolyl)borate,
Tributylammoniumtetra(tolyl)borate,
Tributylammoniumtetra(pentafluorophenyl)borate,
Tributylammoniumtetra(pentafluorophenyl)aluminate,
Tripropylammoniumtetra(dimethylphenyl)borate,
Tributylammoniumtetra(trifluoromethylphenyl)borate,
Tributylammoniumtetra(4-fluorophenyl)borate,
N,N-Dimethylbenzylammonium-tetrakispentafluorophenylborate,
N,N-Dimethylhexylamonium-tetrakispentafluorophenylborate,
N,N-Dimethylaniliniumtetra(phenyl)borate,
N,N-Diethylaniliniumtetra(phenyl)borate,
N,N-Dimethylaniliniumtetrakis(pentafluorophenyl)borate,
N,N-Dimethylaniliniumtetrakis(pentafluorophenyl)aluminate,
N,N-Dimethylbenzylammonium-tetrakispentafluorophenylborate,
N,N-Dimethylhexylamonium-tetrakispentafluorophenylborate,
Di(propyl)ammoniumtetrakis(pentafluorophenyl)borate,
Di(cyclohexyl)ammoniumtetrakis(pentafluorophenyl)borate,
Triphenylphosphoniumtetrakis(phenyl)borate, Triethylphosphoniumtetrakis(phenyl)borate,
Diphenylphosphoniumtetrakis(phenyl)borate,
Tri(methylphenyl)phosphoniumtetrakis(phenyl)borate,
Tri(dimethylphenyl)phosphoniumtetrakis(phenyl)borate,
Triphenylcarbeniumtetrakis(pentafluorophenyl)borate,
Triphenylcarbeniumtetrakis(pentafluorophenyl)aluminate,
Triphenylcarbeniumtetrakis(phenyl)aluminate,
Ferroceniumtetrakis(pentafluorophenyl)borate,
Ferroceniumtetrakis(pentafluorophenyl)aluminate,
Triphenylcarbeniumtetrakis(pentafluorophenyl)borate, and
N,N-Dimethylaniliniumtetrakis(pentafluorophenyl)borate.

Additional examples of compounds of formula $D^+E^-$ that can be used according to the present invention are described in WO 04/005360, WO 02/102811 and WO 01/62764.

Organic aluminum compounds used as compound c) are those of formula $H_jAlU_{3-j}$ or $H_jAl_2U_{6-j}$ as described above.

The catalysts described above can also be supported on an inert carrier. This is achieved by depositing the metallocene compound a) or the product of the reaction thereof with the component b), or the component b) and then the metallocene compound a) on an inert support such as, for example, silica, alumina, Al—Si, Al—Mg mixed oxides, magnesium halides, styrene/divinylbenzene copolymers, polyethylene or polypropylene. The supportation process is carried out in an inert solvent such as hydrocarbon for example toluene, hexane, pentane or propane and at a temperature ranging from 0° C. to 100° C., preferably the process is carried out at room temperature.

A suitable class of supports which can be used is that constituted by porous organic supports functionalized with groups having active hydrogen atoms. Particularly suitable are those in which the organic support is a partially crosslinked styrene polymer. Supports of this type are described in European application EP-633 272.

Another class of inert supports particularly suitable for use according to the invention is that of polyolefin porous prepolymers, particularly polyethylene.

A further suitable class of inert supports for use according to the invention is that of porous magnesium halides such as those described in International application WO 95/32995.

The solid compound thus obtained, in combination with the further addition of the alkylaluminium compound either as such or prereacted with water if necessary, can be usefully employed in the gas-phase polymerization.

The process for obtaining the polypropylene resin to be used in the process of the present invention can be carried out in the liquid phase in the presence or absence of an inert hydrocarbon solvent, or in the gas phase. The hydrocarbon solvent can either be aromatic such as toluene, or aliphatic such as propane, hexane, heptane, isobutane or cyclohexane.

The polymerization temperature is generally comprised between −100° C. and +100° C. and, particularly between 10° C. and +90° C. The polymerization pressure is generally comprised between 0.5 and 100 bar.

In particular when said polypropylene resin contains both the propylene homopolymer or a propylene copolymer (i) and the propylene copolymer (ii) it can be obtained by a multistep process such as that one described in WO03/106553 and WO03/106523.

The polypropylene resin to be used according to the process of the present invention comprises (i) from 10 to 100% by weight of a propylene homopolymer or a propylene copolymer containing from 0.1% to 10% by mol of ethylene or an alpha-olefin of formula $CH_2\!\!=\!\!CHZ$ wherein Z is a linear or branched $C_2$-$C_{20}$ radical; and (ii) from 0 to 90% by weight of a propylene copolymer containing from 0.1% to 10% by mol of ethylene or an alpha-olefin of formula $CH_2\!\!=\!\!CHZ$ wherein Z is a linear or branched $C_2$-$C_{20}$ radical, said propylene copolymer having a content of ethylene or an alpha-olefin of formula $CH_2\!\!=\!\!CHZ$ different from the propylene copolymer (i).

Preferably the polymer (i) in the polypropylene resins ranges from 20% by weight to 100% by weight, more preferably from 30% by weight to 100% by weight.

Preferably the polymer (ii) in the polypropylene resins ranges from 0% to 80% by weight; more preferably from 0% to 70% by weight.

Non limitative examples of alpha olefin of formula $C_2\!\!=\!\!CHZ$ are, 1-butene, 1-pentene, 4-methyl-1-pentene, 1-hexene, 1-octene, 4,6-dimethyl-1-heptene, 1-decene, 1-dodecene.

Preferably the propylene copolymer (i) and (ii) contains ethylene or 1-butene derived units.

Preferably the polypropylene resin to be used in the process of the present invention is a polypropylene homopolymer or a propylene/ethylene copolymer (i).

According to the process of present invention the following polypropylene composition can also be used:

| Polymer (i) | Polymer (ii) |
|---|---|
| 10-20% by weight | 90-80% by weight |
| 20-30% by weight | 80-70% by weight |
| 30-40% by weight | 70-60% by weight |
| 40-50% by weight | 60-50% by weight |
| 50-60% by weight | 50-40% by weight |
| 60-70% by weight | 40-30% by weight |
| 70-80% by weight | 30-20% by weight |
| 80-90% by weight | 20-10% by weight |

The sheet made of the propylene resin to be used according to the process of the present invention can be made according to the procedure commonly known in the art, such as the procedure described in Thermoforming—A Practical Guide by Peter Schwarzmann, Adolf Illig (Hansa FachBuch/2001)

The sheet obtained according to step a) of the present invention can be finally formed—in-and off-line—in the final articles according to the procedure commonly known in the art for thermoplastics such vacuum forming, drape forming, air slip or with plug assistance.

A further object of the present invention is a thermoformed article comprising a polypropylene resin comprising:
(i) from 10 to 100% by weight of a propylene homopolymer or a propylene copolymer containing from 0.1% to 10% by mol of derived units of ethylene or an alpha-olefin of formula $CH_2\!\!=\!\!CHZ$ wherein Z is a linear or branched $C_2$-$C_{20}$ radical; and
(ii) from 0 to 90% by weight of a propylene copolymer containing from 0.1% to 10% by mol of derived units of ethylene or an alpha-olefin of formula $CH_2\!\!=\!\!CHZ$ wherein Z is a linear or branched $C_2$-$C_{20}$ radical, said propylene copolymer having a content of ethylene or an alpha-olefin of formula $CH_2\!\!=\!\!CHZ$ different from the propylene copolymer (i);

wherein said polypropylene resin is endowed with the following characteristics:
   a) distribution of molecular weight Mw/Mn lower than 4; preferably lower than 3;
   b) 2,1 insertions measured with by $^{13}C$—NMR lower than 0.50%; preferably lower than 0.40%;

c) eta* and the frequency ω meet the following relation for ω comprised between 0.1 ad 1:

$$eta^* > 3700\omega^{(-0.13)}$$

preferably the relation is $eta^* > 3800\omega^{(-0.16)}$; more preferably it is $eta^* > 3900\omega^{(-0.18)}$; even more preferably $eta^* > 4000\omega^{(-0.2)}$ d) melt flow rate (MFR) lower than 5; preferably lower than 4; more preferably lower than 3 (ISO 1133).

The propylene resin is preferably further endowed with the following characteristic:

e) isotactic pentads (mmmm) measured with by $^{13}$C-NMR higher than 94%; preferably higher than 95%.

Preferably the polypropylene resin is a propylene homopolymer or a propylene/ethylene copolymer.

The dynamic rheology test in order to evaluate the relationship eta* vs ω is carried out according to ISO 6721-10. The test has to be carried out at 200° C.

The following examples are given for illustrative purpose and do not intend to limit the invention.

EXAMPLES

Melt flow rate (MFR) was measured according to ISO 1133 under conditions (230° C./2.16 kg) [g/10 min]

Molecular Weight Distribution

The determination of the molar mass $M_n$ and the molar mass distribution $M_w/M_n$ was carried out by gel permeation chromatography (GPC) at 145° C. in 1,2,4-trichlorobenzene using a GPC apparatus model 150C from Waters. The data were evaluated by means of the Win-GPC software from HS-Entwicklungsgesellschaft für wissenschaftliche Hard und Software mbH, Ober-Hilbersheim. The columns were calibrated by means of polypropylene standards having molar masses from 100 to $10^7$ g/mol.

Dynamic Rheology Test

The dinamyc rehology test in order to evaluate the relationship eta* vs ω is carried out according to ISO 6721-10. The test has been carried out at 200° C.

Haze and Clarity

Haze (%) has been measured according to ASTM D 1003; clarity was measured according to ASTM D 1746.

NMR

The proton and carbon spectra of polymers were obtained using a Bruker DPX 400 spectrometer operating in the Fourier transform mode at 120° C. at 400.13 MHz and 100.61 MHz respectively. The samples were dissolved in $C_2D_2Cl_4$. As reference the residual peak of $C_2DHCl_4$ in the $^1H$ spectra (5.95 ppm) and the peak of the mmmm pentad in the $^{13}C$ spectra (21.8 ppm) were used. Proton spectra were acquired with a 45° pulse and 5 seconds of delay between pulses; 256 transients were stored for each spectrum. The carbon spectra were acquired with a 90° pulse and 12 seconds (15 seconds for ethylene based polymers) of delay between pulses and CPD (waltz 16) to remove $^1H$-$^{13}C$ couplings. About 3000 transients were stored for each spectrum. mmmm pentads were calculated according to Randall, J. C. *Polymer Sequence Determination*; Academic Press: New York, 1977.

2,1 insertions have been measured according to the method proposed in A. Tsusui, Polymer 30, 1350 (1989).

Ethylene content was measured by means of IR spectra

Preparation of Polypropylene Resins

The catalyst system is prepared as described in PCT/EP2004/007061 by using rac-dimethylsilylene(2-methyl-4(4'tertbutyl-penhyl)-indenyl) (2-isopropyl-4(4'tertbutyl-penhyl)-indenyl)zirconium dichloride prepared as described in US 2003/0149199 instead of rac-dimethylsilylbis(2-methyl-4,5-benzo-indenyl)-zirconium dichloride.

Propylene Polymerization General Procedure

The catalyst system in the form of catalyst mud obtained as described in PCT/EP2004/007061 is fed in the precontact vessel in which it is diluted with about 5 (Kg/h) of propane. From the pre-contact vessel the catalyst system is fed to the prepolymerization loop in which propylene is fed at the same time according to the data reported in table 1. The residence time of the catalyst in the loop is about 8 minutes. The prepolymerized catalyst obtained in the prepolymerization loop is then continuously feed into the first loop reactor and subsequently the obtained polymer is fed to the second reactor (data are reported in table 2). The polymer is discharged from the second reactor, separated from the unreacted monomer and dried. The reaction conditions are reported in table 1

TABLE 1

| | | First reactor | | | |
|---|---|---|---|---|---|
| Ex | Prepolymerization temperature (° C.) | $C_3$ (Kg/h) | $C_2$ (Kg/h) | $H_2$ (ppm) | temperature (° C.) |
| 1 | 45 | 400 | none | none | 70 |
| 2 | 45 | 400 | 7 | 563.1 | 70 |
| 3 | 43 | 400 | 11.3 | 708.9 | 70 |
| 4 | 43 | 400 | 12.6 | 605 | 70 |

| | Second reactor | | | |
|---|---|---|---|---|
| Ex | $C_3$ (Kg/h) | $C_2$ (Kg/h) | $H_2$ (ppm) | temperature (° C.) |
| 1 | 116 | none | none | 70 |
| 2 | 106 | 4.5 | 178.1 | 70 |
| 3 | 114 | 5.4 | 210.3 | 70 |
| 4 | 113 | 6.2 | 200 | 70 |

The polypropylene resins have been characterised, the value are shown in table 2

TABLE 2

| Ex | Mw/Mn GPC | isotactic pentads mmmm % | 2,1 insertions % | C2 % mol | MFR |
|---|---|---|---|---|---|
| 1 | 2.52 | 96.4 | 0.34 | 0 | 3 |
| 2 | 2.38 | >95 | 0.11 | 3.08 | 4.7 |
| 3 | 2.45 | >95 | 0.07 | 4.3 | 2.6 |
| 4 | 2.45 | >95 | 0.06 | 5.03 | 2.8 |

Samples of polymers obtained as above were subjected to the dynamic rheology test (ISO 6721-10) in order to evaluate the relationship eta* vs. ω. The results are reported in table 3

TABLE 3

| | | Freq ω (rad/s) | | | | | |
|---|---|---|---|---|---|---|---|
| | | 0.1 | 0.15849 | 0.25119 | 0.39811 | 0.63097 | 1.00003 |
| | | | | $3700\omega^{(-0.13)}$ | | | |
| Ex | | 4991.16 | 4701.12 | 4427.94 | 4170.63 | 3928.26 | 3928.26 |
| 1 | Eta* (Pa-s) | 9330.48 | 8561.57 | 7620.62 | 6755.32 | 5895.48 | 5078.25 |
| 2 | Eta* (Pa-s) | 6696.73 | 6224.26 | 5702.30 | 5163.85 | 4598.52 | 4050.05 |
| 3 | Eta* (Pa-s) | 12112.8 | 10846.2 | 9652.53 | 8423.57 | 7292.58 | 6252.77 |
| 4 | Eta* (Pa-s) | 9975.52 | 9063.18 | 8127.17 | 7194.57 | 6294.8 | 5464.57 |

Comparative Propylene Resins

Propylene resin a) and propylene resin b) were two commercial product sold under the trademark Moplen® HP548L (resin A) and CLYRELL® RC514L (resin B) having the characteristics reported in table 4

TABLE 4

| resin | C2 % wt | Mw/Mn | isotactic pentads mmmm % | 2,1 insertions % | MFR |
|---|---|---|---|---|---|
| A | 0 | 5.2 | 97.2 | n.d. | 6 |
| B | 1.7 | 6.9 | >95 | n.d. | 6 | n.d. not detectable

Samples of comparative propylene resins A) and B) were subjected to the dinamyc rehology test in order to evaluate the relationship eta* vs ω (ISO 6721-10). The results are reported in table 5

TABLE 5

| | | Freq ω (rad/s) | | | | | |
|---|---|---|---|---|---|---|---|
| | | 0.1 | 0.15849 | 0.25119 | 0.39811 | 0.63097 | 1.00003 |
| | | | | $3700\omega^{(-0.13)}$ | | | |
| Resin | | 4991.16 | 4701.12 | 4427.94 | 4170.63 | 3928.26 | 3928.26 |
| A | Eta* (Pa-s) | 4740.66 | 4591.33 | 4363.13 | 4111.55 | 3838.77 | 3522.78 |
| B | Eta* (Pa-s) | 4479.72 | 4281.85 | 4027.39 | 3782.59 | 3478.73 | 3162.14 |

Preparation of Comparative Propylene Resin C)

The procedure reported above for the preparation of resins of sample 1 was repeated by using rac-dimethylsilylbis(2-methyl-4-phenyl-indenyl)zirconium dichloride. The obtained polypropylene resin has been characterised, the value are shown in table 6

TABLE 6

| resin | Mw/Mn GPC | isotactic pentads mmmm % | 2,1 insertions % | MFR |
|---|---|---|---|---|
| C | 2.4 | >95 | 0.38 | 4 |

Resin C was subjected to the dinamyc rehology test (ASTM?) in order to evaluate the relationship eta* vs. ω. The results are reported in table 7

TABLE 7

| | | Freq ω (rad/s) | | | | | |
|---|---|---|---|---|---|---|---|
| | | 0.1 | 0.15849 | 0.25119 | 0.39811 | 0.63097 | 1.00003 |
| | | | | $3700\omega^{(-0.13)}$ | | | |
| Resin | Eta* (Pa-s) | 4991.16 | 4701.12 | 4427.94 | 4170.63 | 3928.26 | 3928.26 |
| C | | 4956.16 | 4689.12 | 4382.94 | 4136.63 | 3873.26 | 3672.26 |

From tables 5 and 7 it clearly results that resin A, B and C do not meet the relationship eta*>$3700\omega^{9-0.13)}$.

Thermoforming

Resins of examples 1-4; resins A and B were pelletized in a twin screw extruder Irganox™ 1076 (200 ppm); B215 (1500 ppm); CaSt (500 ppm); Geniset MD LM 30 (2000 ppm) were added during the Extrusion.

Formation of the Sheets

The resins were extruded in sheets of ca. 1.5 mm thickness, using the NMR/Kaufmann extrusion line. The screw speed as well as the extrusion temperature profile and the roll-stack profile were varied as described in table 8; haul-off speed+die opening were kept constant. Sodium Benzoate(NaBz) and DMDBS were added as nucleant in an amount of 1% by weight.

Thermoforming

The sheets have been thermoformed 1 day after sheet extrusion on the OMV F-25 line into round cups. The thermoforming also called sheet temperature was measured by an IR camera scanning the upper sheet surface just before the forming device. The thermoforming temperature was adapted in order to optimise the cups in terms of optical properties and material distribution, different thermoforming temperature was used for each sample. The line speed was kept constant. The properties of the thermoformed cups are reported in table 10.

TABLE 8

| Ex | Sheet | Nucleation | Melting T | Upper roll | Middle roll | Lower roll | Screw speed (rpm) | Temperature range |
|---|---|---|---|---|---|---|---|---|
| 1 | E-1 | NaBz | 240 | 86 | 94 | 82 | 70 | 340-345-350 |
| 1 | E-2 | DMDBS | 235 | 74 | 84 | 62 | 70 | 340-345-350 |
| 2 | E-3 | NaBz | 235 | 64 | 86 | 76 | 70 | 295-300 |
| 2 | E-4 | DMDBS | 225 | 54 | 66 | 60 | 25 | 300-305-310 |
| 3 | E-5 | DMDBS | 210 | 50 | 58 | 46 | 20 | 290-295 |
| A | A | DMDBS | 230 | 65 | 70 | 55 | 70 | 320-325-330-335 |
| B | B | NABz | 235 | 40 | 64 | 56 | 70 | 350-355-360 |
| C | C | NaBz | 240 | 85 | 95 | 84 | 70 | 340-345-350 |

Die opening: 1.7 mm
Sheet thikness: 1.5 mm
Speed (Strike/min): 18

The sheets have been tested the results are reported in table 9

TABLE 9

| | Mechanical properties | | | Optical properties | |
|---|---|---|---|---|---|
| Sheet | biaxial impact | Tens Mod MD | Tens Mod TD | Haze | Clarity |
| E-1 | 12.9 | 2048 | 1900 | 58.7 | 96.3 |
| E-2 | 26.6 | 1780 | 1808 | 44.6 | 96.5 |
| E-3 | 23.7 | 1292 | 1331 | 62.6 | 96.2 |
| E-4 | 27.9 | 1252 | 1189 | 23.4 | 96.5 |
| E-5 | 28.3 | 927 | 966 | 19.9 | 98.2 |
| A | | 1486 | 1459 | 47.5 | 95.1 |
| B | 9.46 | 1681 | 1623 | 83.1 | 62.8 |
| C | 10.8 | 1895 | 1756 | 50.2 | 95.4 |

Tensile modulus MD and tensile modulus TD have been measured in a Tensile apparatus Instron 4507 equipped with 10 kN load cell and 2 pneumatic grips. For each sheet 6 samples for each direction (Machine Direction-Transverse Direction) of 80+/−2 mm length, 10+/−0.2 mm width and 4+/−0.2 mm thickness have been cut. All the samples should be conditioned for one week at 23±2° C. and 50±5% humidity.

Biaxial impact has been measured by using a IFWIS tester Ccast Fractovis Type 6849.000 apparatus according to ISO-6603-2.

TABLE 10

| | | mechanics | | opticals | |
|---|---|---|---|---|---|
| | Thermoforming Temperature ° C. | Impact failure Energy (J) | crushing resistance of containers (stiffness) (N) | Haze % | Clarity % |
| E-1 | 340 | 1.21 | 194.2 | 3.7 | 98.1 |
| | 345 | 1.43 | 201.7 | 2.4 | 98.6 |
| | 350 | 2.12 | 182.9 | 2.6 | 97.9 |
| E-2 | 340 | 1.5 | 209 | 1 | 98.3 |
| | 345 | 2.19 | 186 | 1.6 | 99.2 |
| | 350 | 2.35 | 185.7 | 1.2 | 98.4 |
| E-3 | 295 | NB | 168.8 | 3.5 | 98.2 |
| | 300 | NB | 160.8 | 3.5 | 97.3 |
| | 305 | NB | 170.4 | 2.7 | 98.6 |
| | 305 | 1.52 | n.a. | n.a. | n.a. |
| E-4 | 300 | 6.78 | 178.9 | 1.4 | 97.9 |
| | 305 | NB | 163.5 | 1.4 | 99.2 |
| | 305 | 1.6 | n.a. | | |
| | 310 | NB | 134.5 | 1.6 | 98.4 |
| E-5 | 290 | NB | 139.2 | 0.9 | 99.3 |
| | 290 | 2.3 | n.a. | n.a. | n.a. |
| | 295 | NB | 132.1 | 1 | 98.9 |
| A | 320 | NB | 184 | 3.9 | n.a. |
| | 320 | 1.09 | n.a. | n.a. | n.a. |
| | 325 | NB | 184 | 4.5 | n.a. |
| | 330 | NB | 173 | 4.1 | n.a. |
| | 335 | 22.73 | 154 | 3 | n.a. |
| B | 355 | 1.16 | 239.7 | 5.54 | 96.3 |
| | 360 | 1.16 | 265.7 | 4.73 | 96.3 |
| | 360 | 1.11 | n.a. | n.a. | n.a. |
| | 365 | 1.10 | 230.3 | 4.9 | 94.6 |
| C | 340 | 1.18 | 193.3 | 4.2 | 96.8 |
| | 345 | 1.22 | 197.5 | 3.8 | 97.2. |
| | 350 | 1.50 | 178.6 | 3.6 | 97.6 | n.a. not available
NB not breaking

Impact behavior has been measured with a Vandenberg Impact Tester. The test is performed on the thermoformed articles conditioned at least 1 week at 23±2° C. and 50±5% relative humidity. During the test the container is considered broken as soon as there is any small crack in it. The test has been repeated until at least 10 X's (X broken sample) and 0's (0 unbroken sample) around an equilibrium (Minimum number of failure for ending the test is 10).

Having:

$n_i$=total numbers of X's at each missile weight;
i=0 at the lowest weight when failure occurs;
1 at the weight immediately higher;
2 at the weight higher ...;
$in_i$=i×ni;
N=sum of ni;
A=sum of $in_i$;
$W_0$=weight of missile at which i=o;
$\Delta W$=Weight increment [g];
Impact failure weight Wf[g] is calculated with the following formula:

$$Wf = W0 + (\Delta W (A/N - \frac{1}{2}))$$

Impact failure Energy E[J] is calculated as $$E = Wf \cdot g \cdot h / 1000$$

With g=9.81 m/s$^2$ h=height in [m]

The crushing resistance is determined by the maximum of the force/deformation curve obtained in a compression test performed on the container. The test has been carried out by using a Compression apparatus Instron 4507. The samples have been conditioned for 1 week at 23±2° C. and 50±5% relative humidity. 1 KN load cell has been used for the test. The compression program used was "Method compressive 31".

In order to carry out the test 6 containers have been weighted and the average weight has been calculated [g]. Each sample has been put with the bottom upward in Instron 4507, and the compressive method was started. The pulling speed is 10 mm/min. After each test, a marker on the graph at maximum load produced has been put. When 6 tests are done, the average value has been calculated.

From table 10 it results that comparing a Ziegler Natta homopolymer with the Metallocene catalyst homopolymer with the same nucleation the impact properties on the cups are improved (1.4-2.1 J vs. 1.1 J, even if the top load behaviour is lower (~25%). The thermoformed articles according to the present invention show an improved transparency, ~2.5% in haze on the cups for the metallocene homopolymer vs 4.8 for the ZN, same nucleation. Replacing NaBz as nucleant by the DMDBS as clarifier in the Metallocene catalyst homopolymer the haze on cups can be even lowered further to 1.2-1.6%.

Comparing the Metallocene catalysed random copolymers with 2.5-3% in Ethylene content with ZN random copolymer (1.7% C2), it can be seen that all cups are not breaking during the falling weight impact test at Room Temperature. Furthermore, the Metallocene catalysed randoms are better in their impact performance at 5° C.

The invention claimed is:

1. A process for obtaining thermoformed articles comprising:
   forming a sheet comprising a propylene resin; and
   thermoforming the sheet;
   wherein the propylene resin comprises:
   (i) from 10 to 100% by weight of a propylene homopolymer or a propylene copolymer comprising from 0.1% to 10% by mol of derived units of ethylene or an alpha-olefin of formula $CH_2=CHZ$, wherein Z is a linear or branched $C_2-C_{20}$ radical; and
   (ii) from 0 to 90% by weight of a propylene copolymer comprising from 0.1% to 10% by mol of derived units of ethylene or an alpha-olefin of formula $CH_2=CHZ$, wherein Z is a linear or branched $C_2-C_{20}$ radical, and the propylene copolymer comprises a content of ethylene or an alpha-olefin of formula $CH_2=CHZ$ different from the propylene copolymer (i);
   the propylene resin further comprising:
   a distribution of molecular weight Mw/Mn lower than 4;
   2,1 insertions lower than 0.50% measured by $^{13}C$—NMR;
   eta* and frequency ω meet the following relation for ω comprised between 0.1 and 1 (ISO 6721-10 carried out at 200° C.);
   eta*>3700ω$^{(-0.13)}$; and
   a melt flow rate (MFR) (ISO 1133) lower than 5,
   wherein the propylene resin is obtained by contacting:
   a) a metallocene compound of formula (I):

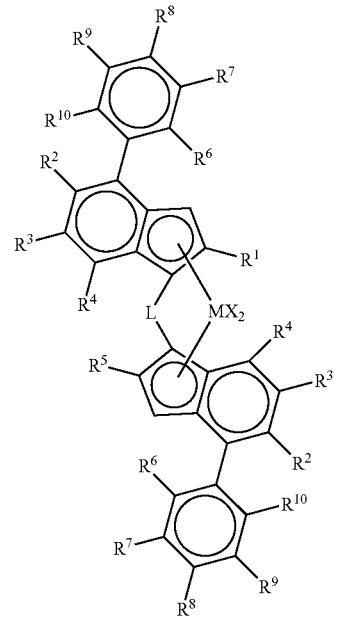

(I)

wherein
   M is a transition metal belonging to group 3, 4, 5, 6 or to the lanthanide or actinide groups in the Periodic Table of the Elements;
   X, same or different, is a hydrogen atom, a halogen atom, or a R, OR, $OSO_2CF_3$, OCOR, SR, $NR_2$ or $PR_2$ group, wherein R is a are linear or branched, cyclic or acyclic, $C_1-C_{40}$-alkyl, $C_2-C_{40}$ alkenyl, $C_2-C_{40}$ alkynyl, $C_6-C_{40}$-aryl, $C_7-C_{40}$-alkylaryl or $C_7-C_{40}$-arylalkyl radicals; optionally containing heteroatoms belonging to groups 13-17 of the Periodic Table of the Elements; or two X can optionally form a substituted or unsubstituted butadienyl radical or a OR'O group wherein R' is a divalent radical selected from $C_1-C_{40}$ alkylidene, $C_6-C_{40}$ arylidene, $C_7-C_{40}$ alkylarylidene and $C_7-C_{40}$ arylalkylidene radicals;

L is a divalent $C_1$-$C_{40}$ hydrocarbon radical optionally containing heteroatoms belonging to groups 13-17 of the Periodic Table of the Elements or a divalent silylidene radical containing up to 5 silicon atom;

$R^1$ and $R^5$ are a $C_1$-$C_{40}$ hydrocarbon radical optionally containing heteroatoms belonging to groups 13-17 of the Periodic Table of the Elements;

$R^2$, $R^3$ and $R^4$, equal to or different from each other, are hydrogen atoms or $C_1$-$C_{40}$ hydrocarbon radicals optionally containing heteroatoms belonging to groups 13-17 of the Periodic Table of the Elements;

$R^6$, $R^7$, $R^8$, $R^9$, and $R^{10}$ equal to or different from each other, are hydrogen atoms or $C_1$-$C_{40}$ hydrocarbon radicals optionally containing heteroatoms belonging to groups 13-17 of the Periodic Table of the Elements, with the proviso that at least one among $R^6$, $R^7$, $R^8$, $R^9$, and $R^{10}$ is different from an hydrogen atom;

b) at least an alumoxane or a compound that forms an alkylmetallocene cation; and c) optionally an organo aluminum compound.

2. The process according to claim 1, wherein the distribution of molecular weight Mw/Mn is lower than 3.

3. The process according to claim 1, wherein the 2,1 insertions are lower than 0.40% measured by $^{13}C$—NMR.

4. The process according to claim 1, wherein the propylene resin further comprises isotactic pentads (mmmm) higher than 94% measured by $^{13}C$—NMR.

5. The process according to claim 1, wherein the propylene resin comprises:
a distribution of molecular weight Mw/Mn lower than 3;
isotactic pentads (mmmm) higher than 95% measured by $^{13}C$—NMR;
2,1 insertions lower than 0.40% measured by $^{13}C$—NMR; and
a melt flow rate (MFR) (ISO 1133) lower than 4.

6. The process according to claim 1, wherein the propylene resin comprises:
eta* and frequency ω meet the following relation for ω comprised between 0.1 ad 1 (ISO 6721-10);

$$eta^* > 3800\omega^{(-0.16)}.$$

7. The process according to claim 1, wherein the polypropylene resin comprises from 20% by weight to 100% by weight of propylene homopolymer or propylene copolymer (i); and from 0% to 80% by weight of propylene homopolymer or propylene copolymer (ii).

8. The process according to claim 1, wherein the polypropylene resin is a propylene homopolymer.

9. A thermoformed article comprising a polypropylene resin comprising:
(i) from 10 to 100% by weight of a propylene homopolymer or a propylene copolymer comprising from 0.1% to 10% by mol of derived units of ethylene or an alpha-olefin of formula $CH_2\!\!=\!\!CHZ$, wherein Z is a linear or branched $C_2$-$C_{20}$ radical; and
(ii) from 0 to 90% by weight of a propylene copolymer comprising from 0.1% to 10% by mol of derived units of ethylene or an alpha-olefin of formula $CH_2\!\!=\!\!CHZ$, wherein Z is a linear or branched $C_2$-$C_{20}$ radical, and the propylene copolymer comprises a content of ethylene or an alpha-olefin of formula $CH_2\!\!=\!\!CHZ$ different from the propylene copolymer (i);

the propylene resin further comprising:
a distribution of molecular weight Mw/Mn lower than 4;
2,1 insertions lower than 0.50% measured by $^{13}C$—NMR;

eta* and frequency ω meet the following relation for ω comprised between 0.1 and 1 (ISO 6721-10 carried out at 200° C.):

$eta^* > 3700\omega^{(-0.13)}$; and a melt flow rate (MFR) (ISO 1133) lower than 5, wherein the propylene resin is obtained by contacting:

a) a metallocene compound of formula (I):

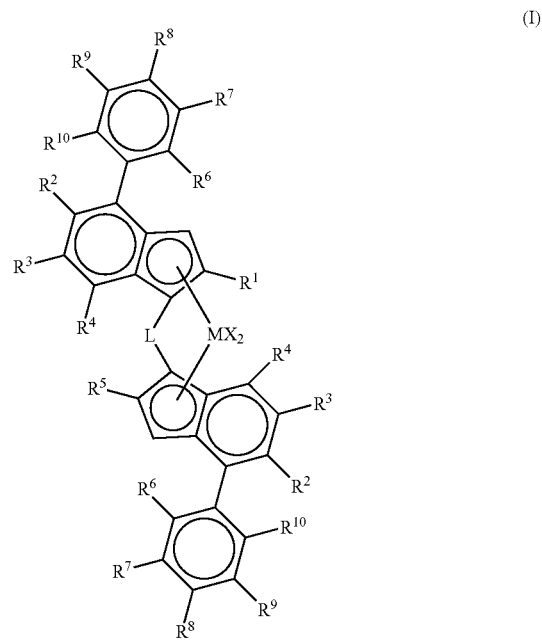

wherein
M is a transition metal belonging to group 3, 4, 5, 6 or to the lanthanide or actinide groups in the Periodic Table of the Elements;

X, same or different, is a hydrogen atom, a halogen atom, or a R, OR, $OSO_2CF_3$, OCOR, SR, $NR_2$ or $PR_2$ group, wherein R is a are linear or branched, cyclic or acyclic, $C_1$-$C_{40}$-alkyl, $C_2$-$C_{40}$ alkenyl, $C_2$-$C_{40}$ alkynyl, $C_6$-$C_{40}$-aryl, $C_7$-$C_{40}$-alkylaryl or $C_7$-$C_{40}$-arylalkyl radicals; optionally containing heteroatoms belonging to groups 13-17 of the Periodic Table of the Elements; or two X can optionally form a substituted or unsubstituted butadienyl radical or a OR'O group wherein R' is a divalent radical selected from $C_1$-$C_{40}$ alkylidene, $C_6$-$C_{40}$ arylidene, $C_7$-$C_{40}$ alkylarylidene and $C_7$-$C_{40}$ arylalkylidene radicals;

L is a divalent $C_1$-$C_{40}$ hydrocarbon radical optionally containing heteroatoms belonging to groups 13-17 of the Periodic Table of the Elements or a divalent silylidene radical containing up to 5 silicon atom;

$R^1$ and $R^5$ are a $C_1$-$C_{40}$ hydrocarbon radical optionally containing heteroatoms belonging to groups 13-17 of the Periodic Table of the Elements;

$R^2$, $R^3$ and $R^4$, equal to or different from each other, are hydrogen atoms or $C_1$-$C_{40}$ hydrocarbon radicals optionally containing heteroatoms belonging to groups 13-17 of the Periodic Table of the Elements;

$R^6$, $R^7$, $R^8$, $R^9$, and $R^{10}$ equal to or different from each other, are hydrogen atoms or $C_1$-$C_{40}$ hydrocarbon radicals optionally containing heteroatoms belonging to groups 13-17 of the Periodic Table of the Elements, with the proviso that at least one among $R^6$, $R^7$, $R^8$, $R^9$, and $R^{10}$ is different from an hydrogen atom;

b) at least an alumoxane or a compound that forms an alkylmetallocene cation; and c) optionally an organo aluminum compound.

* * * * *